(12) United States Patent
Guo et al.

(10) Patent No.: US 9,342,243 B2
(45) Date of Patent: May 17, 2016

(54) METHOD AND ELECTRONIC APPARATUS FOR IMPLEMENTING MULTI-OPERATING SYSTEM

(71) Applicant: Lenovo (Beijing) Co., Ltd., Beijing (CN)

(72) Inventors: Weixian Guo, Beijing (CN); Qi Guo, Beijing (CN); Dakai Zhou, Beijing (CN); Hongwei Li, Beijing (CN); Hongjiang Bi, Beijing (CN); Jianwei Lu, Beijing (CN); Lijun Ma, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 199 days.

(21) Appl. No.: 14/091,962

(22) Filed: Nov. 27, 2013

(65) Prior Publication Data
US 2014/0149647 A1    May 29, 2014

(30) Foreign Application Priority Data

Nov. 28, 2012    (CN) ............... 2012 1 0497456
Mar. 29, 2013    (CN) ............... 2013 1 0109927

(51) Int. Cl.
| G06F 12/00 | (2006.01) |
| G06F 3/06 | (2006.01) |
| G06F 12/02 | (2006.01) |
| G06F 9/44 | (2006.01) |
| G06F 9/50 | (2006.01) |
| G06F 11/14 | (2006.01) |

(52) U.S. Cl.
CPC .............. *G06F 3/06* (2013.01); *G06F 9/4406* (2013.01); *G06F 11/14* (2013.01); *G06F 12/0238* (2013.01); *G06F 9/5077* (2013.01); *G06F 11/1417* (2013.01)

(58) Field of Classification Search
None
See application file for complete search history.

(56) References Cited

U.S. PATENT DOCUMENTS

| 2005/0210476 A1 | 9/2005 | Wu et al. |
| 2008/0005527 A1* | 1/2008 | Bang .................... 711/202 |
| 2008/0147964 A1* | 6/2008 | Chow et al. ............. 711/103 |

(Continued)

FOREIGN PATENT DOCUMENTS

| CN | 101387989 A | 3/2009 |
| CN | 101957769 A | 1/2011 |
| CN | 102789397 A | 11/2012 |

OTHER PUBLICATIONS

First Chinese Office Action regarding Application No. 201210497456.4 dated Mar. 17, 2016. English translation provided by Unitalen Attorneys at Law.

*Primary Examiner* — Kaushikkumar Patel
(74) *Attorney, Agent, or Firm* — Harness, Dickey & Pierce, P.L.C.

(57) ABSTRACT

A method for implementing multi-operating system, applied to an electronic apparatus in which a Solid State Disk, SSD, is provided, the SSD including a plurality of partitions each of which corresponding to a unique logical snapshot table, and a plurality of operating systems being installed in different partitions respectively, wherein the method includes: determining a logical snapshot table corresponding to an operating system to be loaded currently as a first logical snapshot table during a Power On Self Test process of a basic input/output system; and determining a position of a partition in the SSD which corresponds to a reading/writing operation based on the first logical snapshot table if the reading/writing operation is performed on the SSD in a manner of Logical Block Addressing.

17 Claims, 7 Drawing Sheets

(56) References Cited

U.S. PATENT DOCUMENTS

| | | | |
|---|---|---|---|
| 2011/0072188 A1* | 3/2011 | Oh et al. | 711/102 |
| 2012/0042156 A1* | 2/2012 | Ma et al. | 713/2 |
| 2013/0232489 A1* | 9/2013 | Mitsugi et al. | 718/1 |
| 2014/0089629 A1* | 3/2014 | Griffin et al. | 711/173 |
| 2014/0181499 A1* | 6/2014 | Glod | 713/2 |
| 2015/0006795 A1* | 1/2015 | Becker et al. | 711/103 |

* cited by examiner

METHOD AND ELECTRONIC APPARATUS FOR IMPLEMENTING MULTI-OPERATING SYSTEM

CROSS REFERENCE TO RELATED APPLICATION

The present invention claims the priority to the Chinese Patent Application No. 201210497456.4, entitled "METHOD AND ELECTRONIC APPARATUS FOR IMPLEMENTING MULTI-OPERATING SYSTEM", filed with the Chinese Patent Office on Nov. 28, 2012, the entire contents of which is incorporated herein by reference in its entirety.

The present invention claims the priority to the Chinese Patent Application No. 201310109927.4, entitled "SYSTEM RECOVERY METHOD, SYSTEM RECOVERY DEVICE, SOLID STATE DISK AND ELECTRONIC EQUIPMENT", filed with the Chinese Patent Office on Mar. 29, 2013, the entire contents of which is incorporated herein by reference in its entirety.

BACKGROUND

1. Field of the Disclosure

The disclosure relates to a technical field of electronics, and in particular to a method and an electronic apparatus for implementing multi-operating system.

2. Background of the Disclosure

Presently, most of solutions to implement multiple operating systems to coexist on a single Personal Computer (PC) involve many aspects, such as a boot manager which supports multi-operating system, compatibilities among multiple operating systems, and an installing order among the multiple operating systems. Due to restrictions from these aspects, only one operating system is installed on each PC generally.

Currently, with the gradual increasing of the capacity of a Solid State Disk (SSD), and the increasing diversification of the using circumstance of the PC, different operating system circumstances will be encountered by everyone, such as a PC entertainment circumstance, some specific online transaction circumstances, and an office safe circumstance controlled by a company IT strategy. The need of installing multiple operating systems on the same PC begins to emerge when the cost is considered. Thus, to adapt to some specific requirements of circumstances, a second or a third operating system are installed on the same PC, so that the multi-operating system is implemented. The so-called multi-operating system is a computer working manner in which two or more operating systems are installed in the same computer, the same or different tasks or applications can be finished in different operating systems to meet various requirements of the user of the computer. Most computers of the user has only one SSD, if multiple systems are installed on the only one SSD, the installing and the setting are more complicated than installing multiple systems on multiple SSDs. Due to various technical restrictions, it is difficult to install multiple operating systems on the same PC.

Further, it is also necessary to consider version lever of the system when installing the system and the systems needs to be installed orderly from a lower version to a higher version. Because the boot partition of the system is always in a first partition, i.e., the main partition, no matter the systems are installed in the same partition or not. Each system will establish a system boot file in C drive. If the systems are not installed orderly, the boot file of the system in the new version will be covered by the boot file of the system in the old version, and the boot file of the system in the old version can not identify the system in the new version, leading to that the system in the new version can not be visited.

SUMMARY

A method and an electronic apparatus for implementing multi-operating system are provided in the present disclosure, for solving the problem in the prior art that it is difficult to install multiple operating systems on the same PC due to various technical restrictions.

A method for implementing multi-operating system, applied to an electronic apparatus in which a Solid State Disk, SSD, is provided, the SSD comprising a plurality of partitions, and each partition corresponding to a unique logical snapshot table, and a plurality of operating systems being provided in the electronic apparatus and a plurality of operating systems being installed in different partitions respectively, wherein the method includes:

determining a first logical snapshot table corresponding to an operating system to be loaded currently among a plurality of logical snapshot tables during a Power On Self Test process of a basic input/output system; and determining a position of a partition in the SSD which corresponds to a reading/writing operation according to the first logical snapshot table if the reading/writing operation is performed on the SSD in a manner of Logical Block Addressing.

Determining a first logical snapshot table corresponding to an operating system to be loaded currently among a plurality of logical snapshot tables includes:

detecting a first operating system identifier corresponding to an operating system to be loaded; and determining the first logical snapshot table corresponding to the first operating system identifier according to a preset corresponding relation between operating system identifiers and the logical snapshot tables.

The number of the plurality of partitions is greater than that of the plurality of operating systems.

The method further includes:

obtaining a second operating system identifier corresponding to a destination operating system when a first switching instruction for switching the operating system is received; and determining a second logical snapshot table corresponding to the second operating system identifier according to a preset corresponding relation between operating system identifiers and the logical snapshot tables; and determining a position of a partition in the SSD which corresponds to a reading/writing operation according to the second logical snapshot table when the reading/writing operation is performed on the SSD in a manner of Logical Block Addressing.

If a first operating system and a second operating system installed in two partitions respectively are the same, and the two partitions have the same partition format, the method further includes:

detecting a shared file in the first operating system which is shared between the first operating system and the second operating system; and saving a corresponding relation between descriptive information of the shared file and the logical snapshot table corresponding to the first operating system.

If any one of the operating systems calls the shared file, the method further includes:

obtaining a filename of the shared file to be called, obtaining first descriptive information corresponding to the filename according to the filename;

determining a third logical snapshot table corresponding to the first descriptive information according to the saved corresponding relation between the descriptive information of the shared file and the logical snapshot table corresponding to the first operating system; and obtaining the shared file according to the third logical snapshot table.

An electronic apparatus, in which a Solid State Disk, SSD, is provided, the SSD comprising a plurality of partitions, and each partition corresponding to a unique logical snapshot table, and a plurality of operating systems being provided in the electronic apparatus and the plurality of operating systems being installed in different partitions respectively, wherein the electronic apparatus further includes:

a boot unit, adapted to determine, a first logical snapshot table corresponding to an operating system to be loaded currently among a plurality of logical snapshot tables during a Power On Self Test process of a basic input/output system; and a reading/writing unit, adapted to determine a position of a partition in the SSD which corresponds to a reading/writing operation based on the first logical snapshot table if the reading/writing operation is performed on the SSD in a manner of Logical Block Addressing.

The boot unit comprises:

a detecting sub-unit, adapted to detect a first operating system identifier corresponding to the operating system to be loaded; and a determining sub-unit, adapted to determine a first logical snapshot table corresponding to the first operating system identifier according to a preset corresponding relation between operating system identifiers and the logical snapshot tables.

The electronic apparatus further includes:

a switching unit, adapted to obtain a second operating system identifier corresponding to a destination operating system when a first switching instruction for switching the operating system is received; and determine a second logical snapshot table corresponding to the second operating system identifier according to a preset corresponding relation between operating system identifiers and the logical snapshot tables; and determine a position of a partition in the SSD which corresponds to a reading/writing operation according to the second logical snapshot table when the reading/writing operation is performed on the SSD in a manner of Logical Block Addressing.

If a first operating system and a second operating system installed in two partitions respectively are the same, and the two partitions have the same partition format, the electronic apparatus further comprises:

a shared unit, adapted to detect a shared file in the first operating system which is shared between the first operating system and the second operating system; and save a corresponding relation between descriptive information of the shared file and the logical snapshot table corresponding to the first operating system.

The electronic apparatus further includes:

a first partition, wherein the first partition includes:

a first storage zone and a second storage zone, wherein:

the first storage zone is a protected zone and adapted to store backup system data of the first partition;

the second storage zone is a protected zone and adapted to store a first logical snapshot table corresponding to the backup system data;

wherein the first logical snapshot table comprises a corresponding relation between a logical disk address and a physical disk address of the backup system data; and the protected zone is a zone that is adapted to be read only and prohibited from being erased.

Two or more groups of first storage zones and second storage zones are provided, the backup system data and the first logical snapshot table stored in each group are corresponding to different backup time instants, and the first storage zones in the groups are independent of each other or have an intersection.

The electronic apparatus further includes flags one-to-one corresponding to the second storage zones, wherein the flag is adapted to indicate whether the first logical snapshot table stored in the second storage zone is valid.

A system recovery method used in the electronic equipment comprising the SSD, the system recovery method includes:

receiving a system recovery signal;

reading a first logical snapshot table stored in a second storage zone of the SSD in response to the system recovery signal, wherein the first logical snapshot table comprises a corresponding relation between a logical disk address and a physical disk address which are corresponding to backup system data;

reading the backup system data stored in a first storage zone of the first partition of the SSD according to the mapping table; and loading the read backup system data.

The system recovery method further includes: before receiving a system recovery signal, receiving a system backup signal;

backing up system data stored in the first partition of the SSD at a current backup time instant according to the system backup signal to obtain the backup system data, and setting a storage zone of the first partition of the SSD that is occupied by the backup system data as the first storage zone; and backing up the first logical snapshot table corresponding to the backup system data, and setting a storage zone of the first partition of the SSD that is occupied by the first logical snapshot table as the second storage zone.

Backing up system data stored in the first partition of the SSD at a current backup time instant according to the system backup signal to obtain the backup system data, and setting a storage zone of the SSD that is occupied by the backup system data as the first storage zone includes:

defraging data in a predetermined segment of logical disk addresses in the first partition of the SSD at a current backup time instant as the system data to make the storage zone occupied by the defragged system data smaller than that occupied initially by the system data;

setting the storage zone occupied by the defragged system data as the first storage zone; and setting the first storage zone as the protected zone.

The storage zone comprises at least one block and each block comprises at least one page, and defraging data in a predetermined segment of logical disk addresses in the SSD at a current backup time instant as the system data to make the storage zone occupied by the defraged system data smaller than that occupied initially by the system data includes:

detecting whether a block that meets a predetermined condition exists in the storage zone occupied initially by the system data, wherein the predetermined condition comprises that a current block does not belong to the protected zone, valid data is stored in at least one page of the current block and storage utilization ratio of the current block is smaller than a predetermined threshold; and moving the valid data stored in the block that meets the predetermined condition into other blocks if a detection result indicates that there exists the block which meets the predetermined condition; wherein the storage utilization ratio of all of the other blocks or the block except for the last block is greater than or equal to the predetermined threshold, where the storage utilization ratio is a ratio of the number of the page of the current block in which the valid data is stored to the total number of the pages in the current block.

A system recovery device used in the electronic equipment including the SSD, and the system recovery device includes:

a first receiving module adapted to receive a system recovery signal;

a first reading module adapted to read a first logical snapshot table stored in a second storage zone of the first partition of the SSD in response to the system recovery signal received by the first receiving module, wherein the first logical snapshot table comprises a corresponding relation between a logical disk address and a physical disk address which are corresponding to backup system data;

a second reading module adapted to read the backup system data stored in a first storage zone of the first partition of the SSD according to the first logical snapshot table read by the first reading module; and a data loading module adapted to load the backup system data that is read by the second reading module.

The system recovery device further includes:

a second receiving module adapted to receive a system backup signal;

a first backup module adapted to back up system data stored in the first partition of the SSD at a current backup time instant according to the system backup signal received by the second receiving module to obtain the backup system data, and set a storage zone of the first partition of the SSD that is occupied by the backup system data as the first storage zone; and a second backup module adapted to back up the first logical snapshot table corresponding to the backup system data that is backed up by the first backup module, and set a storage zone of the first partition of the SSD that is occupied by the first logical snapshot table as the second storage zone.

The first backup module includes:

a data defraging unit adapted to defrag data in a predetermined segment of logical disk addresses in the first partition of the SSD at a current backup time instant as the system data to make storage zone occupied by the defragged system data smaller than that occupied initially by the system data;

a first setting unit adapted to set the storage zone occupied by the defragged system data defragged by the data defraging unit as the first storage zone; and a first protecting unit adapted to set the first storage zone that is set by the first setting unit as the protected zone.

One or two of the above technical solutions have at least the following technical effects.

According to the method and apparatus provided in the embodiment of the present disclosure, the SSD is exclusively occupied by each operating system for installing, it is unnecessary to consider the case in which multiple operating systems exist simultaneously, and the task of engineering is simplified.

SSD spatial separation between the operating systems is implemented on firmware by SSD, for ensuring its high reliability and stability. It is simple to install the operating system, and each operating system is installed separately without considering the influence from other operating systems.

BRIEF DESCRIPTION OF THE DRAWINGS

The accompany drawings to be used in the description of the embodiments will be described briefly as follows, so that the technical solutions according to the embodiments of the present disclosure will become more apparent. Apparently, the accompany drawings in the following description are only some embodiments of the present disclosure. Other accompany drawings may be obtained by those skilled in the art according to these accompany drawings without any creative work.

DETAILED DESCRIPTION

Figure 1:
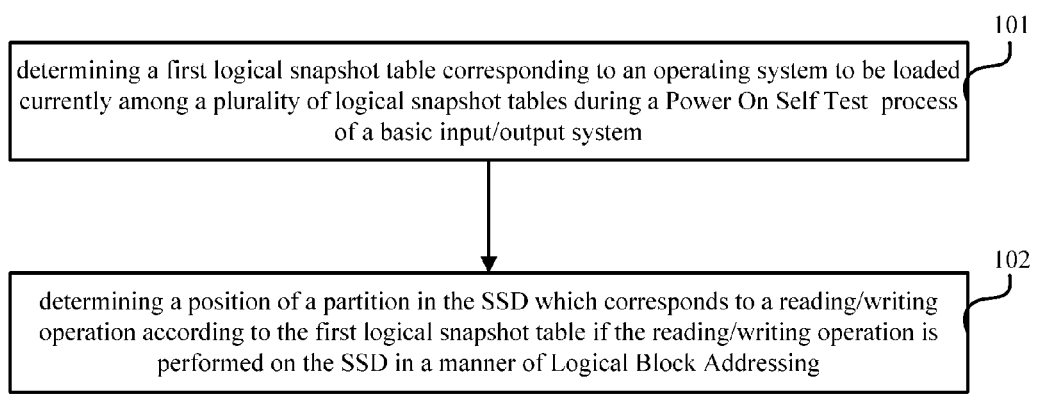
FIG. 1 is a flow chart of a method for implementing multi-operating system according to an embodiment of the disclosure.

The technical solutions in the embodiments of the invention will be described clearly and fully hereinafter in conjunction with the drawings in the embodiments of the invention. Apparently, the embodiments described are only some embodiments of the invention, rather than all embodiments. All other embodiments obtained based on the embodiments in the invention by those skilled in the art without any creative works belong to the scope of protection of the invention.

Currently, with the gradual increasing of the capacity of a SSD, and the increasing diversification of the using circumstance of the PC, different operating system circumstances will be encountered by everyone, such as a PC entertainment circumstance, some specific online transaction circumstances, and an office safe circumstance controlled by a company IT strategy. The need of installing multiple operating systems on the same PC begins to emerge when the cost is considered. Due to various technical restrictions, it is difficult to install multiple operating systems on the same PC in large scale.

A method for implementing multi-operating system is provided in the embodiment of the disclosure. The method is adapted to an electronic apparatus in which a SSD is provided. The SSD includes a plurality of partitions, and each partition corresponds to a unique logical snapshot table. A plurality of operating systems are installed in the electronic apparatus and the plurality of the operating systems are installed in different partitions, where the method includes: determining a first logical snapshot table corresponding to an operating system to be loaded currently among a plurality of logical snapshot tables during a Power On Self Test (POST) process of a basic input/output system (BIOS); and determining a position of a partition in the SSD which corresponds to a reading/writing operation according to the first logical snapshot table if the reading/writing operation is performed on the SSD in a manner of Logical Block Addressing (LBA).

In the method provided in the disclosure, each separate partition corresponds to only one logical snapshot table at one time instant. The installing of the system, the loading of the system, and various reading/writing operation of the system are located to the partition corresponding to each system according to the unique snapshot table corresponding to each partition, thus corresponding operations of each operating system are performed to each separate partition. Then, after the above operations are performed, the SSD is exclusively occupied by each operating system, it is unnecessary to consider the case in which multiple operating systems exist simultaneously, and the engineering task is simplified. SSD spatial separation between the operating systems is implemented on firmware by SSD, for ensuring its high reliability and stability. It is simple to install the operating system, and each operating system is installed separately without considering the influence from other operating systems.

The method provided in the embodiment of the disclosure will be described in further detail in conjunction with the drawings.

As shown in FIG. 1, a method for implementing multi-operating system is provided in the embodiment of the disclosure. The embodiment of the disclosure will be described in detail in conjunction with the drawings.

The method is adapted to an electronic apparatus in which a SSD is provided, and the solution is based on the SSD. Multiple operating systems are provided in the electronic apparatus. To avoid the interference among the multiple systems, the multiple operating systems are installed in different partitions. According to the number of the systems to be installed and the different characteristics of the systems to be installed, the SSD includes multiple partitions. The total number of the multiple partitions in the SSD is greater than the total number of the multiple operating systems, for ensuring that each operating system can be installed in a separate partition.

To avoid the interference among the operating systems installed in the partitions, and to make the operating systems operate separately, each partition corresponds to a unique logical snapshot table in the embodiment of the disclosure. The system installed in each partition can perform an operation to a specific partition according to a corresponding logical snapshot table, without affecting the information in other partitions. The method includes the following step 101 and step 102.

Step 101, determining a first logical snapshot table corresponding to an operating system to be loaded currently among a plurality of logical snapshot tables during a Power On Self Test (POST) process of a basic input/output system (BIOS).

In the embodiment of the disclosure, to avoid the interference among the operating systems, the SSD is divided into multiple partitions, and then the multiple systems are installed into different partitions. During the installing:

different operating systems have different requirements on the format of the partition, thus the format of the partition needs to be considered during the dividing, and the format of each partition is determined according to the operating system to be installed in the partition. Practically, the format of the partition includes: FAT 16, FAT 32, NTFS and EXT2.

FAT16 can be recognized by systems, such as DOS, Win3.X/95/97/98/Me/NT/2000/XP, and Linux, which adopts a File Allocation Table (FAT) of 16 bits, and can support a maximum partition of 2 GB. However, FAT16 has the most significant deficiency, i.e., the low practical use efficiency of the SSD.

FAT32 can be recognized by systems, such as Win97/98/Me/2000/XP, and Linux, and has unlimited partition capacity, which is the most widely used partition format.

NTFS is a file format specific to WinNT/2000/XP, and has a significant advantage of excellent security and stability. It is not prone to generate file fragment for NTFS, which benefits the space utilization of the SSD and the running speed of the software. NETF can record an operation of an user, and restricts the right of the user very strictly that each user only can operate within the authority assigned by the system by, thus the web system and the information are protected adequately.

EXT2 is a representative file format specific to Linux, and has the fastest running speed and the smallest CPU occupation ratio. In conjunction with the Linux operation system, the chance of crashing will be reduced greatly.

In the embodiment of the disclosure, after the partitions are obtained, the SSD SSD is divided in to multiple logical snapshot tables (L2P, LAB to PBA) by implementing the snapshot mechanism via a firmware.

Snapshot is a referenced sign or pointer which is directed to data stored in the storage device, i.e., the status of the data at a certain time instant. The core of the working principle is to establish a list of points, for indicating the address from which the data is read, to provide an image of an instantaneous data, and to copy if the data is changed.

With the cooperation of BIOS, a specific SSD logical snapshot table is selected during the POST process of the BIOS if a specific operating system is selected, and then all subsequent operations will be implemented based on the selected SSD logical snapshot table.

Step 102, determining a position of a partition in the SSD which corresponds to a reading/writing operation according to the first logical snapshot table if the reading/writing operation is performed on the SSD in a manner of Logical Block Addressing (LBA).

In the embodiment of the disclosure, each operating system is installed in a specific partition, and based on the dividing way of the partitions provided in this embodiment, after the partitions are obtained, normal visiting of each partition is performed separately. To each operating system, the SSD is seemed to begin from LBA0, and the SSD is exclusively occupied by each operating system. It is unnecessary to consider the case in which multiple operating systems exist simultaneously, and the engineering task is simplified. SSD spatial separation among the operating systems is implemented on firmware by Solid State Disk (SSD), for ensuring its high reliability and stability. It is simple to install the operating system, and each operating system is installed separately without considering the influence from other operating systems.

In the embodiment of the disclosure, to ensure that the BIOS system can determine the partition corresponding to the operating system during the POST process, the step of determining a first logical snapshot table corresponding to an operating system to be loaded currently among a plurality of logical snapshot tables includes:

detecting a first operating system identifier corresponding to the operating system to be loaded; and determining a first logical snapshot table corresponding to the first operating system identifier according to a preset corresponding relation between operating system identifiers and the logical snapshot tables.

The electronic apparatus in the present disclosure includes multiple operating systems, different operating systems will be selected by the user in different application circumstances, thus for the requirement of the convenient use of the user, the method provided in the embodiment of the disclosure further includes:

obtaining a second operating system identifier corresponding to a destination operating system if a first switching instruction for switching the operating system is received; and determining a second logical snapshot table corresponding to the second operating system identifier according to a preset corresponding relation between operating system identifiers and the logical snapshot tables; and determining a position of a partition in the SSD which corresponds to a reading/writing operation according to the second logical snapshot table if the reading/writing operation is performed on the SSD in a manner of Logical Block Addressing (LBA).

In the embodiment of the disclosure, after the operating system performs the switching operation, a second logical snapshot table corresponding to the destination operating system is determined according to the partition in which the destination operating system is installed, and then the subsequent operations of the destination operating system will be performed based on the second logical snapshot table. The second logical snapshot table is generated for a separate partition, thus, after the operating system is switched to the destination operating system, the operation of each operating system will have no influence on other systems.

Further, although the user needs to switch to different operating systems to perform various operations according to the requirement of different application circumstances, it is necessary that resource can be shared among the systems for many times, therefore the method provided in the embodiment of the disclosure further includes:

if a first operating system and a second operating system installed in two partitions are the same, and the two partitions have the same partition format, the resource can be shared, the method includes:

detecting whether there is a shared file in the first operating system which is shared between the first operating system and the second operating system; and saving a corresponding relation between descriptive information of the shared file and the logical snapshot table corresponding to the first operating system if there is a shared file in the first operating system which is shared between the first operating system and the second operating system.

Further, if any one of the operating systems calls the shared file, the method further includes:

obtaining a filename of the shared file to be called, obtaining a first descriptive information corresponding to the filename according to the filename;

determining a third logical snapshot table corresponding to the first descriptive information according to the saved corresponding relation between the descriptive information of the shared file and the logical snapshot table corresponding to the first operating system; and obtaining the shared file according to the third logical snapshot table.

According to the method provided in the disclosure, the SSD is divided into different partitions, multiple operating systems to be installed in the system are respectively installed in different partitions, then when the operating systems are loaded and run, corresponding operations can be performed based on the logical snapshot table corresponding to each partition, so that each operating system runs without affecting other operating systems.

Figure 2:
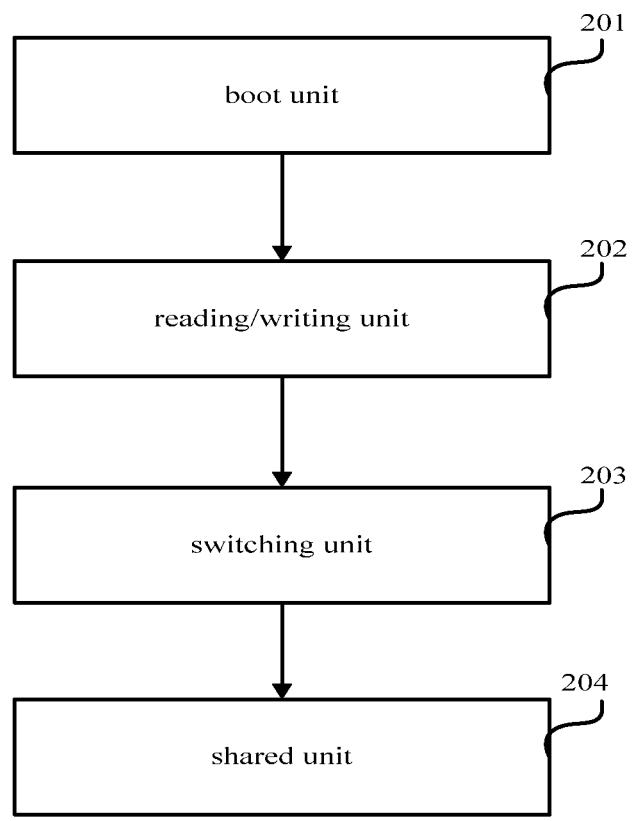
FIG. 2 is a schematic structural diagram of an electronic apparatus according to an embodiment of the disclosure.

According to the above method, an electronic apparatus is further provided in the disclosure. As shown in FIG. 2, a SSD is provided, The SSD including a plurality of partitions, and each partition corresponding to a unique logical snapshot table. A plurality of operating systems are provided in the electronic apparatus and the plurality of operating systems are installed in different partitions, where the electronic apparatus further includes:

a boot unit 201, adapted to determine a first logical snapshot table corresponding to an operating system to be loaded currently among a plurality of logical snapshot tables during a Power On Self Test (POST) process of a basic input/output system (BIOS); and a reading/writing unit 202, adapted to determine a position of a partition in the SSD which corresponds to a reading/writing operation according to the first logical snapshot table if the reading/writing operation is performed on the SSD in a manner of Logical Block Addressing (LBA).

In the embodiment of the disclosure, to ensure that the BIOS system can determine the partition corresponding to the operating system during the POST process, the boot unit 201 includes:

a detecting sub-unit, adapted to detect a first operating system identifier corresponding to the operating system to be loaded; and a determining sub-unit, adapted to determine a first logical snapshot table corresponding to the first operating system identifier according to a preset corresponding relation between operating system identifiers and the logical snapshot tables.

The electronic apparatus in the present disclosure includes multiple operating systems, different operating systems will be selected by the user in different application circumstances, thus for the requirement of the convenient use of the user, the electronic apparatus provided in the embodiment of the disclosure further includes:

a switching unit 203, adapted to obtain a second operating system identifier corresponding to a destination operating system if a first switching instruction for switching the operating system is received; and determine a second logical snapshot table corresponding to the second operating system identifier according to a preset corresponding relation between operating system identifiers and the logical snapshot tables; and determine a position of a partition in the SSD which corresponds to a reading/writing operation based on the second logical snapshot table if the reading/writing operation is performed on the SSD in a manner of Logical Block Addressing (LBA).

Further, although the user needs to switch to different operating systems to perform various operations according to the requirement of different application circumstances, it is necessary that resource can be shared among the systems for many times; if a first operating system and a second operating system installed in two partitions respectively are the same, and the two partitions have the same partition format, the electronic apparatus further includes:

a shared unit 204, adapted to detect whether there is a shared file in the first operating system which is shared between the first operating system and the second operating system; and save a corresponding relation between descriptive information of the shared file and the logical snapshot table corresponding to the first operating system if there is a shared file in the first operating system which is shared between the first operating system and the second operating system.

One or two of the above technical solutions have at least the following technical effects.

According to the method and apparatus provided in the embodiment of the present disclosure, the installing of the system, the loading of the system, and various reading/writing operation of the system are located to the partition corresponding to each system according to the unique snapshot table corresponding to each partition, thus corresponding operations of each operating system are performed to each separate partition. Then, after the above operations are performed, the SSD is exclusively occupied by each operating system, it is unnecessary to consider the case in which multiple operating systems exist simultaneously, and the engineering task is simplified.

SSD spatial separation between the operating systems is implemented on firmware by SSD, for ensuring its high reliability and stability. It is simple to install the operating system, and each operating system is installed separately without considering the influence from other operating systems.

In practical, when system files in one partition (such as a first partition) of the SSD are deleted unintentionally by a user or a system of the first partition suffers viral infection, the operating system of the first partition in the electronic apparatus comes into a collapse state and can not be used continuously. In this case, the operating system of the first partition in the electronic apparatus needs to be recovered.

In electronic apparatus using a traditional mechanical hard disk, an existing system recovery method includes the following steps. First, a hidden partition is set up in the mechanical hard disk, and a backup system data is stored in the hidden partition. When the electronic apparatus needs to be recovered by a user, a first trigger signal for system recovery input by the user is received by the electronic apparatus, and then the electronic apparatus enters into a restart status after receiving the first trigger signal. Second, the backup system data stored in the hidden partition of the mechanical hard disk is copied and overwritten into a normal disk partition corresponding to an installation location of a current operating system.

And third, the backup system data copied newly into the normal disk partition is run by the electronic apparatus, so that the system is recovered.

In the process of implementing the present disclosure, the inventor finds that at least the following problems present in the prior art.

The backup operating system data needs to be read from the hidden partition of the traditional mechanical hard by the electronic apparatus, and overwritten into the normal disk partition. After this, the system recovery is achieved by running the backup operating system in the normal disk partition. Hence, two processes of "reading data" and "overwriting data" need to be performed by the electronic apparatus, and thus the time for system recovery is longer. Also, since the system data needs to be stored respectively in the hidden partition and the normal disk partition of the traditional mechanical hard disk, it is a waste of limited disk space in practice.

For convenience of description, firstly, a knowledge related to a SSD according to the embodiments of the present disclosure is described in detail.

In a nand flash-based SSD, there are several blocks and each block includes several page. Each page, as a basic storage unit, may store data of a certain size. The data to be stored may be stored into the SSD in units of page by an electronic apparatus. The data stored in each page may be either valid data or invalid data. The valid data is data that is available by the electronic apparatus at a current time instant. The invalid data is the valid data that is re-marked as invalid in the case where the data is deleted, updated or the like, so that the page can be recycled. Each page is corresponding to one physical disk address. A corresponding relation between a logical disk address and a physical disk address of each valid data at a current time instant is maintained by the electronic apparatus. The corresponding relation can be referred to as a first logical snapshot table. It should be noted that there is only one first logical snapshot table in a running state at each time instant in the electronic apparatus. This first logical snapshot table determines a space of data of the SSD which can be accessed by the electronic apparatus. The physical disk address of the SSD that is not in the first logical snapshot table is transparent to the electronic apparatus.

Figure 3:
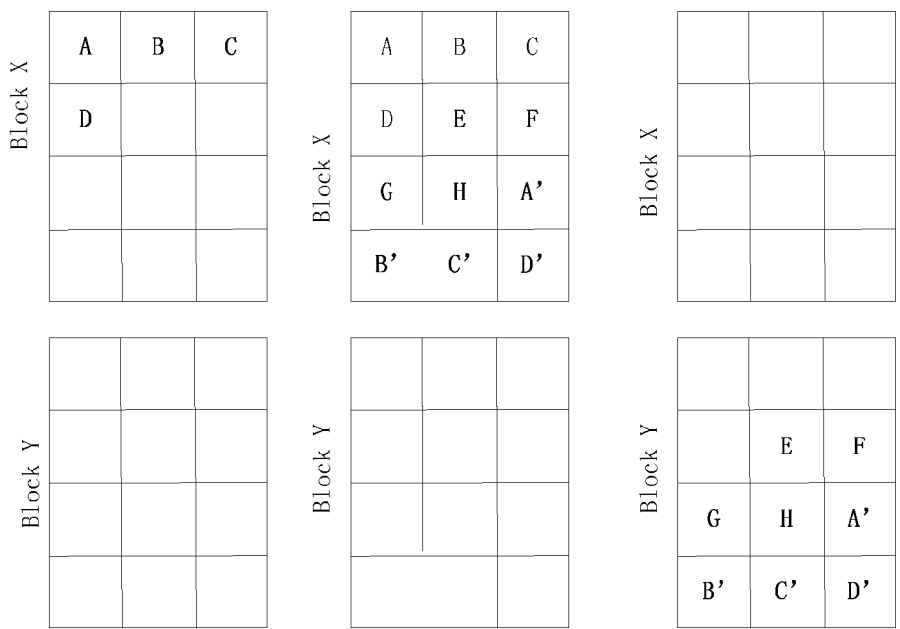
FIG. 3 is a schematic diagram of a SSD when a garbage is collected according to the present disclosure.

It should be noted that one difference between the SSD and a mechanical hard disk is as follow. For the mechanical hard disk, in the case where one zone needs to be recycled and new data needs to be re-written into the zone, the new data may be directly rewritten into this zone. However, for the SSD, in the case where one zone needs to be recycled and new data needs to be re-written into the zone, the new data needs to be re-written after an original data is erased. Also, the data in the SSD is written in units of page and deleted in units of block. Therefore, for the SSD, the zone must be recycled in units of block rather than in units of page which is the smallest unit of storage. Specifically, referring to FIG. 3, data A to D are written into a block X by the electronic apparatus (referring to a first column in FIG. 3). In the case where the data is changed, data A' to D' are re-written and data E to H are written into the other blank pages, therefore the block X is full (referring to a second column in FIG. 3), and the invalid data A to D are included in the block. In order to obtain pages occupied by the invalid data, the block X needs to be deleted entirely by the electronic apparatus. In the process of deleting the block X by the electronic apparatus, the valid data included in the block X needs to be moved into other new blocks by the electronic apparatus. Specifically, the data E to H and the data A' to D' may be moved into a new block Y by the electronic apparatus, then the data stored in the block X is deleted (referring to a third column in FIG. 3), and thereby the storage space of the block X is obtained.

Figure 4:
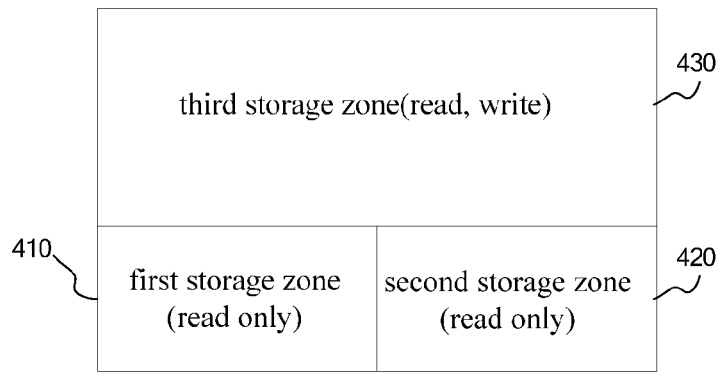
FIG. 4 is a schematic structural diagram of a first partition of a SSD according to a first embodiment of the present disclosure.

FIG. 4 shows a schematic structural diagram of a first partition of a SSD according to an embodiment of the present disclosure, the first partition of the SSD includes: a first storage zone 410 and a second storage zone 420.

In the present disclosure, the SSD includes a plurality of partitions and the plurality of partitions have the same structure. Here, one partition of the plurality of partitions (such as a first partition) is taken as an example to illustrate the structure of the partition of the SSD.

The first storage zone 410 is a protected zone and adapted to store backup system data of the first partition.

The second storage zone 420 is a protected zone and adapted to store a first logical snapshot table corresponding to the backup system data of the first partition. The first logical snapshot table includes a corresponding relation between a logical disk address and a physical disk address of the backup system data of the first partition.

The protected zone is a zone that only can be read and is prohibited from being erased.

Alternatively, two or more groups of first storage zones 410 and second storage zones 420 are provided, the backup system data of the first partition and the first logical snapshot table stored in each group are corresponding to different backup time instants, and the first storage zones 410 in the groups are independent of each other or have an intersection.

Alternatively, the first partition of the SSD may further include flags one-to-one corresponding to the second storage zones 120, where the flag is adapted to indicate whether the first logical snapshot table stored in the second storage zone 120 is valid.

It should be noted that in practice, in order that a write operation may be continuously performed on the first partition of the SSD by the electronic apparatus, the first partition of the SSD may further include a third storage zone 430. The third storage zone 430 may be a read/write zone, which is not limited in this embodiment.

In summary, in the SSD according to this embodiment, backup system data of the first partition is stored in the first storage zone, a first logical snapshot table corresponding to the backup system data of the first partition is stored in the second storage zone, and the first storage zone and the second storage zone are both protected zones. Hence, after the first logical snapshot table stored in the second storage zone is read by the electronic apparatus, the backup system data of the first partition stored in the first storage zone can be read according to the first logical snapshot table, and thereby the system recovery is achieved fleetly.

Figure 5:
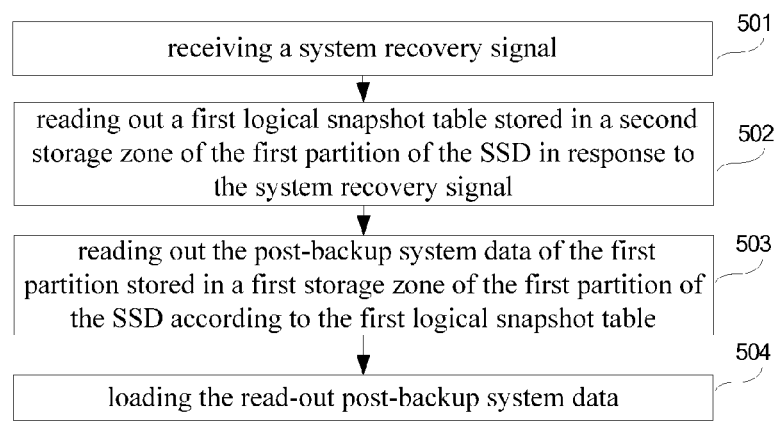
FIG. 5 is a flowchart of a system recovery method of a first partition of a SSD according to an embodiment of the present disclosure.

FIG. 5 shows a flowchart of a system recovery method according to an embodiment of the present disclosure, which may be used in an electronic apparatus including the first partition of the SSD according to FIG. 4. The system recovery method may include the following steps S501 to S504.

Step 501, receiving a system recovery signal.

In the present disclosure, the SSD includes a plurality of partitions. Here, one partition of the plurality of partitions (such as a first partition) is taken as an example to illustrate the system recovery method.

When a system of a first partition of the SSD of an electronic apparatus used by a user is in a collapse state, a system recovery signal of the first partition may be transmitted to the electronic apparatus by the user. Accordingly, the system recovery signal of the first partition may be received by the electronic apparatus. In practice, the electronic apparatus may enter into a restart status after receiving the system recovery signal of the first partition, which is not limited in this embodiment and the system recover of the first partition of the SSD of the electronic apparatus is taken as an example.

Step 502, reading a first logical snapshot table stored in a second storage zone of the first partition of the SSD in response to the system recovery signal.

When the electronic apparatus begins to restart, the first logical snapshot table stored in a second storage zone of the first partition of the SSD can be read by the electronic apparatus according to the system recovery signal. That is, the first logical snapshot table stored in the second storage zone may be set as a running state by the electronic apparatus according to the system recovery signal, and the first logical snapshot table in a running state before the restarting is saved or deleted.

The first logical snapshot table may include a corresponding relation between a logical disk address and a physical disk address of the backup system data.

Step 503, reading the backup system data of the first partition stored in a first storage zone of the first partition of the SSD according to the first logical snapshot table.

The data in the logical disk address may be read by the electronic apparatus when the electronic apparatus restarts. The first logical snapshot table is stored in the second storage zone of the first partition of the SSD, which includes a corresponding relation between the logical disk address and the physical disk address corresponding to the backup system data. Therefore, after the first logical snapshot table is read by the electronic apparatus, the backup system data stored in a first storage zone of the first partition of the SSD may be read by the electronic apparatus according to the first logical snapshot table.

Step 204, loading the read-backup system data.

After the backup system data of the first partition is read by the electronic apparatus, the read backup system data of the first partition may be loaded by electronic apparatus, and thereby the system recovery of the first partition of the SSD of the electronic apparatus is achieved.

In summary, with the system recovery method according to this embodiment, a system recovery signal of the first partition of the SSD is received; a first logical snapshot table stored in a second storage zone of the first partition of the SSD is read according to the system recovery signal; the backup system data of the first partition stored in a first storage zone of the first partition of the SSD is read according to the first logical snapshot table; and the read backup system data is loaded. The problems of a long system recovery time and the waste of disk space in the prior art are solved. During the system recovery, only the first logical snapshot table stored in the the first partition of SSD needs to be read, thus the backup system data of the first partition is read and run according to the first logical snapshot table, and thereby the system recovery time is shortened.

Figure 6:
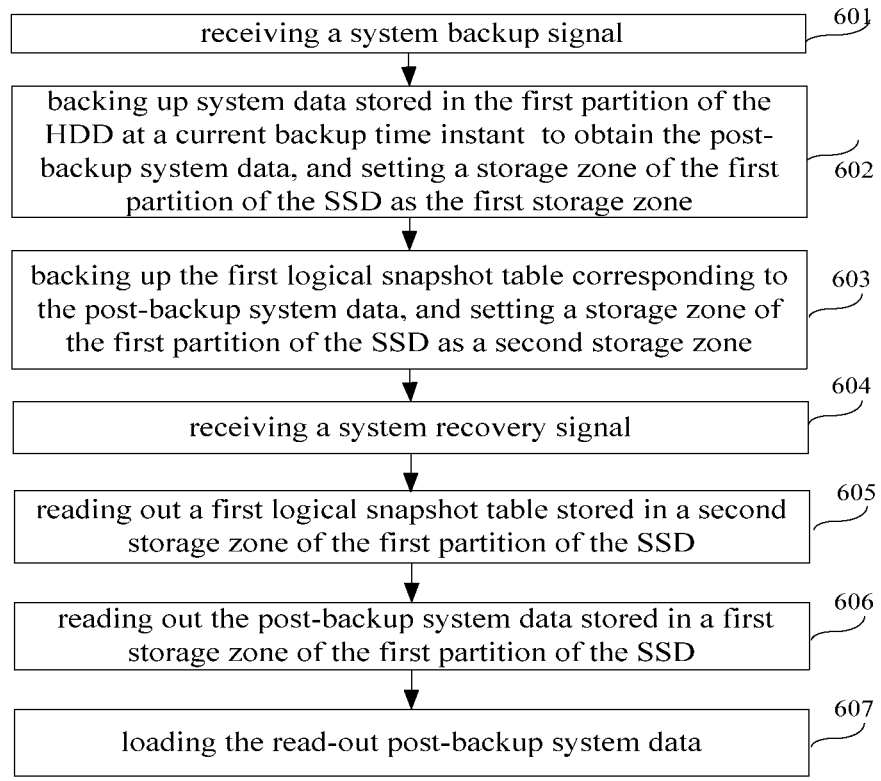
FIG. 6 is a flowchart of a system recovery method of a first partition of a SSD according to another embodiment of the present disclosure.

FIG. 6 shows a flowchart of a system recovery method according to an embodiment of the present disclosure, which may be used in an electronic apparatus including the SSD described in FIG. 4. The system recovery method may include the following steps S601 to S607.

Step 601, receiving a system backup signal.

In the present disclosure, take the system of a first partition of the SSD as an example to illustrate the method of system recover.

In the process of the use of electronic devices by the user, in order that the electronic apparatus may be recovered to a current system state, the user may request the electronic apparatus to back up the system data of the first partition, and the system backup signal may be received accordingly by the electronic apparatus.

For example, in order that the electronic apparatus may be recovered to the factory state when the electronic apparatus comes into a state of system collapse, the user may send a system backup signal for backing up the factory system data of the first partition (it's supposed in the present disclosure that the factory system is installed in the first partition), and the system backup signal may be received accordingly by the electronic apparatus.

Step 602, backing up system data stored in the first partition of the SSD at a current backup time instant according to the system backup signal to obtain the backup system data, and setting a storage zone of the first partition of the SSD that is occupied by the backup system data as the first storage zone.

After the system backup signal is received by the electronic apparatus, the system data of the first partition stored in the first partition of SSD at the current backup time instant may be backed up by the electronic apparatus according to the system backup signal. Thus, the backup system data of the first partition is obtained, and a storage zone of the first partition of the SSD that is occupied by the backup system data of the first partition is set as the first storage zone of the first partition of the SSD.

The step of backing up system data stored in the first partition of the SSD at a current backup time instant according to the system backup signal implemented by the electronic apparatus may include the following steps 1 to 3.

Step 1, defraging, as the system data, data in a predetermined segment of logical disk addresses in the first partition of the SSD at a current backup time instant to make the storage zone occupied by the defragged system data smaller than that occupied initially by the system data.

When the system data is stored in the first partition of the SSD by the electronic apparatus, the case that the system data is written wrong and need to be re-stored may occur in the electronic apparatus. Particularly, most of the system data exists in the form of a compressed package, thus valid system data is obtained by the electronic apparatus only after the compressed package is decompressed. Addition data generated in the process of the decompression has no meaning for the electronic apparatus, and therefore, after the system data is stored by the electronic apparatus in sequence into each page of each block in the first partition of the SSD, the data stored in some pages of each block may be invalid. That is, the number of the blocks in the first partition of the SSD occupied by the system data at the time of actual storage is far greater than that of actually needed. Thereby, after the blocks in which the system data is stored is set as a protected zone by the electronic apparatus, only a few free blocks in the first partition of the SSD may be adapted to store data. Thus, the disk utilization ratio of the first partition of the SSD is extremely low. Hence, in order to allow the pages in which the invalid data is stored to be re-written to take full advantage of the storage space of the first partition of the SSD, the system data to be backed up may be defragged by the electronic apparatus to make the storage zone occupied by the defragged system data smaller than that occupied initially by the system data.

Also, the first partition of the SSD can not identify the data stored in the physical disk, and the system data to be backed up only can be obtained according to the corresponding relation between the logical disk address and the physical disk address after the data in a segment of the backup logical disk addresses is received. Thus, after the system backup signal is received by electronic apparatus, the data in the predetermined segment of logical disk addresses in the first partition of the SSD at a current backup time instant may be defragged by the electronic apparatus. Accordingly, after the segment of logical disk addresses of the data to be backed up is read by the first partition of the SSD in the electronic apparatus, the data in the segment of physical disk addresses is defragged according to the corresponding relation between the logical disk address and the physical disk address.

The step of defraging the data in a predetermined segment of logical disk addresses in the first partition of the SSD at a current backup time instant to make the storage zone occupied by the defragged system data smaller than that occupied initially by the system data implemented by the electronic apparatus may include the following steps A to B.

Step A, detecting whether a block that meets a predetermined condition exists in the storage zone occupied initially by the system data, where the predetermined condition includes that a current block does not belong to the protected zone, valid data is stored in at least one page of the current block and storage utilization ratio for the current block is smaller than a predetermined threshold.

The storage zone of the first partition of the SSD includes at least one block, and each block includes at least one page. Data stored in each page may be either a valid data or an invalid data. Therefore, in order that the system data is stored into fewer blocks as much as possible, and the valid data is stored into more pages of the block as much as possible, when the data in a predetermined segment of logical disk addresses in the first partition of the SSD at the current backup time instant is defragged by the electronic apparatus, that whether the block meets the predetermined condition exists in the storage zone occupied initially by the system data is detected by the electronic apparatus. The predetermined condition includes that the current block does not belong to the protected zone, valid data is stored in at least one page of the current block and storage utilization ratio for the current block is smaller than a predetermined threshold.

The system data may be backed up for multiple times by the electronic apparatus, and the factory original system data is defragged at each time the system data is backed up. While the system data is backed up for the first time, the zone for storing the original system data may have already been set as a protected zone by the electronic apparatus. Therefore, when the system data to be backed up at the current time instant is backed up by the electronic apparatus, whether the current block in the storage zone occupied initially by the system data belongs to the protected zone may be firstly detected by the electronic apparatus. The current block is not defragged if the detection result indicates that the current block belongs to the protected zone. Whether the storage utilization for the current block is smaller than the predetermined threshold is detected sequentially if the detection result indicates that the current block does not belong to the protected zone. It should be noted that the current block dose not need to be defragged since the current block does not have valid data if the current block is a free block. Therefore, before whether storage utilization for the current block is smaller than the predetermined threshold is detected by the electronic apparatus, whether the valid data is stored in at least one page of the current block may also be detected by the electronic apparatus, which is not limited in this embodiment.

For example, the predetermined threshold is 0.9, and each block in the first partition of the SSD includes 256 pages. When the system data is stored into the first partition of the SSD by the electronic apparatus, the number of the blocks occupied initially by the system data is 2. In a first block of the two blocks, the number of the pages in which the valid data is stored is 243. And in a second block of the two blocks, the number of the pages in which the valid data is stored is 34. Therefore, whether each block belongs to the protected zone may be detected respectively by the electronic apparatus, and whether the valid data is stored in at least one page of the each block and whether the storage utilization ratio for the current block is smaller than 0.9 are detected.

It should be noted that in practice, the predetermined threshold may be set as a different value according to the specific requirements. And the greater the predetermined threshold is, that is, the more the number of the valid pages in each block is, the smaller the zone occupied by the defragged system data is, and the higher the space utilization ratio of the first partition of the SSD is, which is not limited in this embodiment.

Step B, moving the valid data stored in the block that meets the predetermined condition into other blocks if a detection result indicates that there exists the block which meets the predetermined condition, and the storage utilization ratio of all of the other blocks in which the valid data is stored or the other block except for the last block is greater than or equal to the predetermined threshold.

When the block that meets the predetermined condition is detected by the electronic apparatus, the valid data stored in the block that meets the predetermined condition may be moved into other free blocks for storing, thus, the storage utilization ratio of all of the other blocks in which the valid data is stored or the other blocks except for the last block is greater than or equal to the predetermined threshold.

The storage utilization is a ratio of the number of the pages of the current block in which the valid data is stored to the total number of the pages in the current block.

The valid data stored in the block that meets the predetermined condition may be all moved by the electronic apparatus into a first block for storing. And after the pages in the first block all store the valid data, the valid data which have not been moved are moved into a second block for storing, until all the valid data are moved, which is not limited in this embodiment.

It should be noted that after the valid data stored in the block that meets the predetermined condition are moved into the other blocks by the electronic apparatus, the storage utilization ratio of the last block of the other blocks may be smaller than the predetermined threshold, the reason for this may be that the system data only needs to occupy several integral blocks and a few pages of another one block, which is not limited in this embodiment.

Step 2, setting the storage zone occupied by the defragged system data as the first storage zone.

After the data in the segment of logical disk addresses in the first partition of the SSD at a current time instant is defragged as the system data by the electronic apparatus, the storage zone occupied by the defragged system data may be set as the first storage zone by the electronic apparatus.

Step 3, setting the first storage zone as the protected zone.

It is possible that only a few pages of the last block in the first storage zone store the valid data. Therefore, when the garbage is collected by the electronic apparatus, the valid data stored in the few pages of the last block may be moved into other blocks by the electronic apparatus for storing, and the first logical snapshot table corresponding to the backup system data is changed. Also, the process of garbage collection needs to occupy many system resources, and therefore, in order to prevent the blocks in the first storage zone from being collected as garbage, the first storage zone may be set as the protected zone by the electronic apparatus. The protected zone is a zone that can only be read and is prohibited from being erased, and which is not described again in this embodiment.

Step 603, backing up the first logical snapshot table corresponding to the backup system data, and setting a storage zone of the first partition of the SSD that is occupied by the first logical snapshot table as a second storage zone.

In order that the backup system data corresponding to the physical disk addresses in the first partition of the SSD may be read by the electronic apparatus according to the logical disk address, hence, after the system data is backed up by the electronic apparatus, the first logical snapshot table corresponding to the backup system data may be backed up by the electronic apparatus, and the storage zone of the first partition of the SSD that is occupied by the first logical snapshot table is set as the second storage zone.

The step of backing up the first logical snapshot table corresponding to the backup system data by the electronic apparatus may include the following steps 1 to 3.

Step 1, backing up a corresponding relation between a logical disk address and a physical disk address of the backup system data as the first logical snapshot table corresponding to the backup system data, and setting a storage zone of the first partition of the SSD that is occupied by the first logical snapshot table as the second storage zone.

When the system data at the current time instant is defragged by the electronic apparatus, the physical addresses in which the system data is stored are changed constantly, and therefore the corresponding relation between the logical disk address and the physical disk address of the system data is changed constantly. Hence, after the system data is backed up by the electronic apparatus, in order that the backup system data stored in the physical disk addresses in the first partition of the SSD may be read by the electronic apparatus according to the logical disk address, the corresponding relation between the logical disk address and the physical disk address of the backup system data may be stored as the first logical snapshot table corresponding to the backup system data by the electronic apparatus. And the storage zone of the first partition of the SSD that is occupied by the first logical snapshot table is set as the second storage zone.

Step 2, setting the second storage zone as the protected zone.

It is possible that the valid data is stored in only a few pages of the block in the second storage zone in which the first logical snapshot table is stored. In order to prevent the blocks in the second storage zone from being collected as garbage, the second storage zone may also be set as the protected zone by the electronic apparatus, which is not limited in this embodiment.

Step 3, setting a flag for the second storage zone, where the flag is adapted to indicate whether the first logical snapshot table stored in the second storage zone is valid.

In order to identify whether the first logical snapshot table stored in the second storage zone is valid, a flag may be set for the second storage zone by the electronic apparatus.

The flag is adapted to indicate whether the first logical snapshot table stored in the second storage zone is valid.

It should be noted additionally that in practice, it can be selected by the user that the system data may be backed up for multiple times at different backup time instants. The backup method at each time is the same as that of step 301 to step 303, which is not limited in this embodiment. For convenience of illustration, in this embodiment, a zone in which the backup system data is stored is referred to as the first storage zone, and a zone in which the first logical snapshot table corresponding to the backup system data is stored is referred to as the second storage zone. When the backing up is carried out by the electronic apparatus for multiple times, two or more groups of first storage zones and second storages zone may be stored in the electronic apparatus. And when the system data that baked up for two times has the same portion, the first storage zones in two groups may have an intersection, which is not limited in this embodiment, and the times for which the system data is baked up is not limited. Also, when the backing up is carried out for multiple times, an identifier may be set for each backup system data by the electronic apparatus to identify each backup system data, and which is also not limited in this embodiment.

Step 604, receiving a system recovery signal.

When the system of the electronic apparatus needs to be recovered to the factory system data by the user, a system recovery signal may be transmitted to the electronic apparatus by the user. Accordingly, the system recovery signal may be received by the electronic apparatus. In practice, the electronic apparatus may enter into a restart status after the system recovery signal is received, which is not limited in this embodiment and is taken as an example.

A flag may be set for the first logical snapshot table in the second storage zone by the electronic apparatus, which indicates whether the first logical snapshot table stored in the second storage zone is valid. After the system recovery signal is received by the electronic apparatus, the flag corresponding to the first logical snapshot table of the backup factory system data is may be set as valid by the electronic apparatus.

Alternatively, when multiple backup system data exist in the electronic apparatus, that is, two or more groups of first storage zones and second storage zones are provided, the backup system data and the first logical snapshot table stored in each group are corresponding to different backup time instants. It can be selected by the user which system status corresponding to the backup system data is recovered to. Therefore, the receiving a system recovery signal by the electronic apparatus may include the following steps 1 to 2.

Step 1, receiving a selection signal for selecting one backup time instant from two or more backup time instants.

When the system recovery is carried out for the electronic apparatus by the user, it can be selected that the system is recovered to the system status corresponding to the backup system data for any backup time instant among two or more backup time instants. Therefore, the selection signal for selecting one backup time instant from two or more backup time instants can be received by the electronic apparatus.

Step 2, setting the flag of the second storage zone corresponding to the selected backup time instant as valid, where the flag that is set as valid is the system recovery signal.

After the selection signal is received by the electronic apparatus, the flag of the second storage zone corresponding to the selected backup time instant is set as valid by electronic apparatus. The flag that is set as valid is the system recovery signal.

Step 605, reading a first logical snapshot table stored in a second storage zone of the first partition of the SSD according to the system recovery signal.

Since the first logical snapshot table in the second storage zone is set as valid after the system recovery signal is received by the electronic apparatus, the first logical snapshot table stored in the second storage zone of the first partition of the SSD may be read by the electronic apparatus. That is, after the system recovery signal is received by the electronic apparatus, the first logical snapshot table stored in the second storage zone is set as a running state by the electronic apparatus. When the electronic apparatus begins to restart, the first logical snapshot table in the running state may be read by the electronic apparatus, and the first logical snapshot table before the restarting time instant is set as invalid.

It should be noted that in the case where the system recovery signal received by the electronic apparatus is the flag when the flag of the second storage zone corresponding to the selected backup time instant is set as valid, the first logical snapshot table stored in the second storage zone of the SSD corresponding to the flag that is set as valid may be read by the electronic apparatus, which is not limited in this embodiment.

Step 606, reading the backup system data stored in a first storage zone of the first partition of the SSD according to the first logical snapshot table.

After the electronic apparatus begins to restart and read the first logical snapshot table, the backup system data stored in a first storage zone of the first partition of the SSD may be read by the electronic apparatus according to the first logical snapshot table.

Step 607, loading the read backup system data.

After the backup system data is read by the electronic apparatus, the backup system data may be loaded by the electronic apparatus. Thus, the electronic apparatus may be recovered to the factory system status. When the electronic apparatus starts up normally, the system data is also loaded by reading the first logical snapshot table. Hence the system recovery time of the electronic apparatus is equivalent to the time taken by the electronic apparatus to start up normally. Thereby the system recovery time is negligible.

In summary, with the system recovery method according to this embodiment, a system recovery signal is received; a first logical snapshot table stored in a second storage zone of the first partition of the SSD is read according to the system recovery signal; the backup system data stored in a first storage zone is read according to the first logical snapshot table; and the read backup system data is loaded. The problems of a long system recovery time and the waste of disk space in the prior art are solved. During the system recovery, only the first logical snapshot table stored in the first partition of the SSD needs to be read, thus the backup system data is read and run according to the first logical snapshot table, and thereby the system recovery time is shortened. Also, in this embodiment, since the system data is backed up at multiple backup time instants, during the system recovery, it is possible to select one backup system data from the backup system data corresponding to two or more backup time instants to recover. Hence the system status corresponding to different backup system data can be restored selectively according to the use requirement. In addition, in this embodiment, when the system data is backed up, the system data is moved from the initial storage zone to the first storage zone, thereby only one system data is stored in the SSD. The problem of the waste of disk space in the background is solved.

Figure 7:
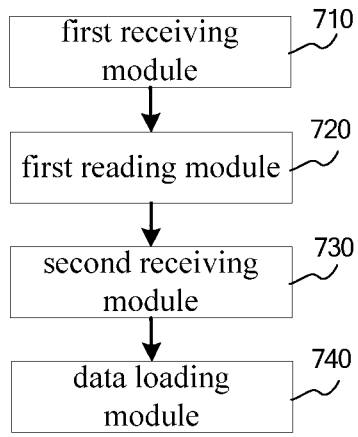
FIG. 7 is a block diagram of a structure of a system recovery device of a first partition of a SSD according to an embodiment of the present disclosure.

FIG. 7 shows a block diagram of a structure of a system recovery device according to an embodiment of the present disclosure, the system recovery device may be implemented as a part or all of the electronic apparatus including the SSD in FIG. 4. The system recovery device may include: a first receiving module 710, a first reading module 720, a second reading module 730, and a data loading module 740.

The first receiving module 710 is adapted to receive a system recovery signal;

The first reading module 720 is adapted to read a first logical snapshot table stored in a second storage zone of a first partition of the SSD in response to the system recovery signal received by the first receiving module 710, where the first logical snapshot table includes a corresponding relation between a logical disk address and a physical disk address which are corresponding to backup system data;

In the present disclosure, the SSD includes a plurality of partitions. Here, one partition of the plurality of partitions (such as the first partition) is taken as an example to illustrate the system recovery device.

The second reading module 730 is adapted to read the backup system data stored in a first storage zone of the first partition of the SSD according to the first logical snapshot table read by the first reading module 720; and The data loading module 740 is adapted to load the backup system data that is read by the second reading module 730.

In summary, with the system recovery device according to this embodiment, a system recovery signal is received; a first logical snapshot table stored in a second storage zone of the first partition of the SSD is read according to the system recovery signal; the backup system data stored in the first storage zone is read according to the first logical snapshot table; and the read backup system data is loaded. The problems of a long system recovery time and the waste of disk space in the prior art are solved. During the system recovery, only the first logical snapshot table stored in the first partition of SSD needs to be read, thus the backup system data is read and run according to the first logical snapshot table, and thereby the system recovery time is shortened.

Figure 8:
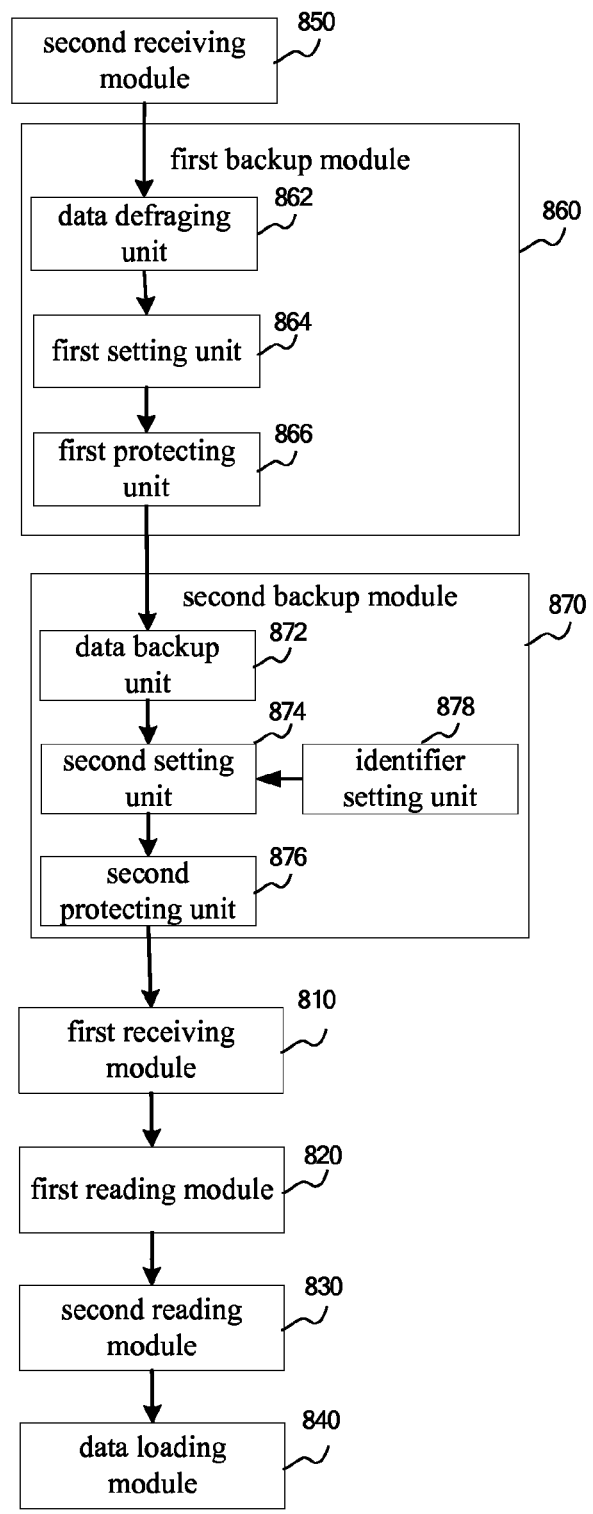
FIG. 8 is a block diagram of a structure of a system recovery device of a first partition of a SSD according to another embodiment of the present disclosure.

FIG. 8 shows a block diagram of a structure of a system recovery device according to an embodiment of the present disclosure. The system recovery device may be implemented as a part or all of the electronic apparatus including the SSD according to FIG. 4. The system recovery device may include: a first receiving module 810, a first reading module 820, a second reading module 830 and a data loading module 840.

The first receiving module 810 is adapted to receive a system recovery signal.

The first reading module 820 is adapted to read a first logical snapshot table stored in a second storage zone of the SSD in response to the system recovery signal received by the first receiving module 810, where the first logical snapshot table includes a corresponding relation between a logical disk address and a physical disk address which are corresponding to backup system data.

In the present disclosure, the SSD includes a plurality of partitions. Here, one partition of the plurality of partitions (such as the first partition) is taken as an example to illustrate the system recovery device.

The second reading module 830 is adapted to read the backup system data stored in a first storage zone of the first partition of the SSD according to the first logical snapshot table read by the first reading module 820.

The data loading module 840 is adapted to load the backup system data that is read by the second reading module 830.

Furthermore, the system recovery device may further include: a second receiving module 850, a first backup module 860 and a second backup module 870.

The second receiving module 850 is adapted to receive a system backup signal.

The first backup module 860 is adapted to back up system data stored in the first partition of the SSD at a current backup time instant according to the system backup signal received by the second receiving module 850 to obtain the backup system data, and set a storage zone of the first partition of the SSD that is occupied by the backup system data as a first storage zone.

The second backup module 870 is adapted to back up the first logical snapshot table corresponding to the backup system data that is backed up by the first backup module 860, and set a storage zone of the first partition of the SSD that is occupied by the first logical snapshot table as a second storage zone.

Furthermore, the first backup module 860 includes: a data defraging unit 862, a first setting unit 864 and a first protecting unit 866.

The data defraging unit 862 is adapted to defrag, as the system data, data in a predetermined segment of logical disk addresses in the first partition of the SSD at a current backup time instant, to make the storage zone occupied by the defragged system data smaller than that occupied initially by the system data.

The first setting unit 864 is adapted to set the storage zone occupied by the defragged system data defragged by the data defraging unit 862 as the first storage zone.

The first protecting unit 866 is adapted to set the first storage zone that is set by the first setting unit 864 as a protected zone.

Figure 9:
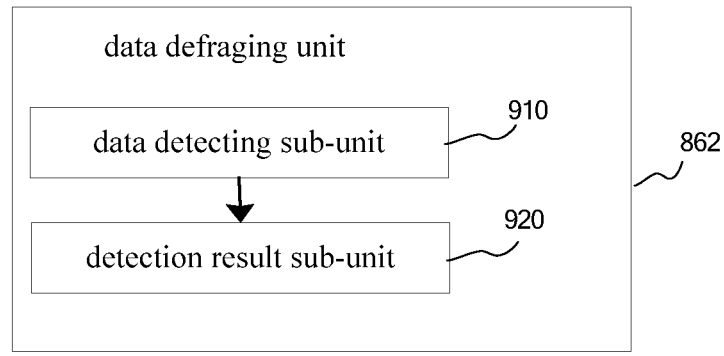
FIG. 9 is a block diagram of a structure of a data defraging unit according to an embodiment of the present disclosure.

Furthermore, referring to FIG. 9, the storage zone includes at least one block and each block includes at least one page, and the data defraging unit 862 includes a data detecting sub-unit 910 and a detection result sub-unit 920.

the data detecting sub-unit 910 is adapted to detect whether a block that meets a predetermined condition exists in the storage zone occupied initially by the system data, where the predetermined condition includes that a current block does not belong to the protected zone, valid data is stored in at least one page of the current block and storage utilization ration of the current block is smaller than a predetermined threshold; and the detection result sub-unit 920 is adapted to move the valid data stored in the block that meets the predetermined condition to other blocks if a detection result detected by the data detecting sub-unit 910 indicates that there exists the block that meets the predetermined condition, and storage utilization ration of all of the other blocks or the block except for the last one is greater than or equal to the predetermined threshold, where the storage utilization ratio is a ratio of the number of the page of the current block in which the valid data is stored to the total number of the pages in the current block.

Furthermore, the second backup module 870 may include: a data backup unit 872, a second setting unit 874, a second protecting unit 876, and an identifier setting unit 878.

The data backup unit 872 is adapted to store, as the first logical snapshot table corresponding to the backup system data, a corresponding relation between a logical disk address and a physical disk address of the backup system data.

The second setting unit 874 is adapted to set a storage zone of the first partition of the SSD that is occupied by the first logical snapshot table that is backed up by the data backup unit 872 as the second storage zone.

The second protecting unit 876 is adapted to set the second storage zone that is set by the second setting unit 874 as the protected zone.

The identifier setting unit 878 is adapted to set a flag for the second storage zone that is set by the second setting unit 874, where the flag is adapted to indicate whether the first logical snapshot table stored in the second storage zone is valid.

Figure 10:
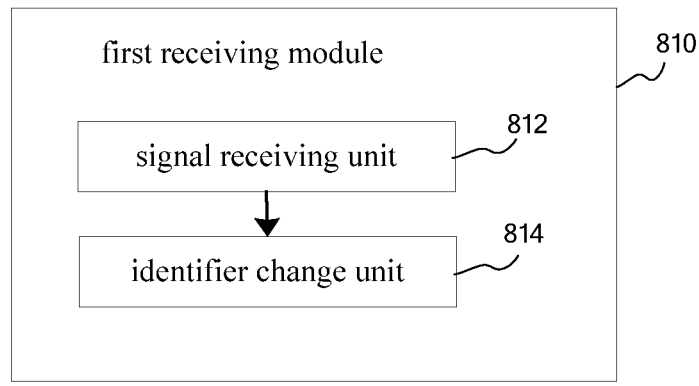
FIG. 10 is a block diagram of a structure of a first receiving module according to an embodiment of the present disclosure.

Furthermore, referring to FIG. 10, two or more groups of first storage zones and second storage zones are provided, the backup system data and the first logical snapshot table stored in each group are corresponding to different backup time instants, the first receiving module 810 includes:

a signal receiving unit 812, adapted to receive a selection signal for selecting one backup time instant from two or more backup time instants; and an identifier change unit 814, adapted to set the flag of the second storage zone corresponding to the selected backup time instant as valid, where the flag that is set as valid is the system recovery signal, and where the first reading module 820 is also adapted to read the first logical snapshot table stored in the second storage zone of the first partition of the SSD corresponding to the flag that is set as valid.

In summary, with the system recovery device according to this embodiment, a system recovery signal is received; a first logical snapshot table stored in a second storage zone of the first partition of the SSD is read according to the system recovery signal; the backup system data stored in a first storage zone is read according to the first logical snapshot table; and the read backup system data is loaded. The problems of a long system recovery time and the waste of disk space in the prior art are solved. During the system recovery, only the first logical snapshot table stored in the first partition of the SSD needs to be read, thus the backup system data is read and run according to the first logical snapshot table, and thereby the system recovery time is shortened. Also, in this embodiment, since the system data is backed up at multiple backup time instants, during the system recovery, it is possible to select one backup system data from the backup system data corresponding to two or more backup time instants to recover. Hence the system status corresponding to different backup system data can be restored selectively according to the use requirement.

It should be noted that when the system is recovered by the system recovery device according to the above-described embodiments, the division of the functional modules described above is just taken as an example for illumination. In practice, the functions assigning may be completed by different functional modules as required. That is, the internal structure of the apparatus may be divided into different functional modules to complete all or a part of the function described above. In addition, the system recovery device and the system recovery method according to the embodiments described above have the same conception. Its specific implementation process refers to the embodiment for the method, and which is not described here.

The method described in the invention is not limited to the examples in the embodiments, and other embodiments can be derived by those skilled in the art based on the technical solution of the invention, which also fall within the scope of protection of the invention.

Apparently, various modifications and variations can be made to the invention by those skilled in the art without deviating from the spirit and scope of the invention. Therefore, if these modifications and variations of the invention fall within the scope of the claim of the invention and its equivalent, the invention also intends to include these modifications and variations.

The invention claimed is:

1. A method for implementing a multi-operating system, applied to an electronic apparatus including a Solid State Disk (SSD), wherein the SSD includes: a plurality of partitions each partition corresponding to a unique logical snapshot table, and a plurality of operating systems installed respectively in the plurality of partitions, the method comprising:
   determining a first logical snapshot table corresponding to an operating system of the plurality of operating systems to be loaded currently among a plurality of logical snapshot tables during a Power On Self Test process of a basic input/output system; and
   determining a position of a partition of the plurality of partitions in the SSD that corresponds to a reading/writing operation according to the first logical snapshot table in response to the reading/writing operation being performed on the SSD in a manner of Logical Block Addressing.

2. The method according to claim 1, wherein determining the first logical snapshot table corresponding to the operating system to be loaded currently among the plurality of logical snapshot tables comprises:
   detecting a first operating system identifier corresponding to the operating system to be loaded; and
   determining the first logical snapshot table corresponding to the first operating system identifier according to a preset corresponding relation between a plurality of operating system identifiers and the plurality of logical snapshot tables.

3. The method according to claim 1, wherein a number of the plurality of partitions is greater than a number of the plurality of operating systems.

4. The method according to claim 1, further comprising:
   obtaining a second operating system identifier corresponding to a destination operating system when a first switching instruction for switching the operating system is received;
   determining a second logical snapshot table corresponding to the second operating system identifier according to a preset corresponding relation between a plurality of operating system identifiers and the plurality of logical snapshot tables; and
   determining a position of a partition of the plurality of partitions in the SSD that corresponds to a reading/writing operation according to the second logical snapshot table in response to the reading/writing operation being performed on the SSD in a manner of Logical Block Addressing.

5. The method according to claim 1, further comprising, in response to a first operating system and a second operating system installed respectively in two partitions of the plurality of partitions being the same and the two partitions having a same partition format:
   detecting a shared file in the first operating system that is shared between the first operating system and the second operating system; and
   saving a corresponding relation between descriptive information of the shared file and the first logical snapshot table corresponding to the first operating system.

6. The method according to claim 5, further comprising, in response to one of the plurality of operating systems calling the shared file:
   obtaining a filename of the shared file to be called, and obtaining first descriptive information corresponding to the filename according to the filename;
   determining a third logical snapshot table corresponding to the first descriptive information according to the saved corresponding relation between the descriptive information of the shared file and the first logical snapshot table corresponding to the first operating system; and
   obtaining the shared file according to the third logical snapshot table.

7. An electronic apparatus comprising:
   a Solid State Disk (SSD), the SSD including a plurality of partitions corresponding to a unique logical snapshot table, and a plurality of operating systems installed respectively in the plurality of partitions;
   a boot unit configured to determine a first logical snapshot table corresponding to an operating system of the plurality of operating systems to be loaded currently among a plurality of logical snapshot tables during a Power On Self Test process of a basic input/output system; and
   a reading/writing unit configured to determine a position of a partition of the plurality of partitions in the SSD that corresponds to a reading/writing operation based on the first logical snapshot table in response to the reading/writing operation being performed on the SSD in a manner of Logical Block Addressing (LBA).

8. The electronic apparatus according to claim 7, wherein the boot unit comprises:
   a detecting sub-unit configured to detect a first operating system identifier corresponding to the operating system to be loaded; and
   a determining sub-unit configured to determine the first logical snapshot table corresponding to the first operating system identifier according to a preset corresponding relation between a plurality of operating system identifiers and the plurality of logical snapshot tables.

9. The electronic apparatus according to claim 7, further comprising a switching unit configured to:
   obtain a second operating system identifier corresponding to a destination operating system in response to a first switching instruction for switching the operating system being received;
   determine a second logical snapshot table corresponding to the second operating system identifier according to a preset corresponding relation between a plurality of operating system identifiers and the plurality of logical snapshot tables; and determine a position of a partition in the SSD that corresponds to a reading/writing operation according to the second logical snapshot table in response to the reading/writing operation being performed on the SSD in a manner of Logical Block Addressing.

10. The electronic apparatus according to claim 7, wherein if a first operating system and a second operating system respectively installed in two partitions of the plurality of partitions are the same, and the two partitions have a same partition format, the electronic apparatus further comprises:

a shared unit configured to detect a shared file in the first operating system that is shared between the first operating system and the second operating system, and save a corresponding relation between descriptive information of the shared file and the first logical snapshot table corresponding to the first operating system.

11. The electronic apparatus according to claim 7, wherein the SSD further comprises a first partition, wherein the first partition includes a first storage zone and a second storage zone, the first storage zone being a protected zone and configured to store backup system data of the first partition, the second storage zone being a protected zone and configured to store the first logical snapshot table corresponding to the backup system data, the first logical snapshot table including a corresponding relation between a logical disk address and a physical disk address of the backup system data, and the protected zone being read only and prohibited from being erased.

12. The electronic apparatus according to claim 11, further comprising two or more groups of first storage zones and two or more groups of second storage zones, wherein the backup system data stored in each of the two or more groups of the first storage zones and the first logical snapshot table stored in each of the two or more groups of the second storage zones are respectively corresponding to different backup time instants, and the first storage zones of the respective two of more groups are independent of each other or have an intersection.

13. The electronic apparatus according to claim 11, further comprising a plurality of flags having one-to-one correspondence with the second storage zones, wherein each of the plurality of flags is configured to indicate whether the first logical snapshot table stored in the second storage zone is valid.

14. A system recovery method used in an electronic apparatus, wherein:

the electronic apparatus includes: (i) a Solid State Disk (SSD) having (1) a plurality of partitions each corresponding to a unique logical snapshot table, and (2) a plurality of operating systems installed respectively in the plurality of partitions, (ii) a boot unit configured to determine a first logical snapshot table corresponding to an operating system of the plurality of operating systems to be loaded currently among a plurality of logical snapshot tables during a Power On Self Test process of a basic input/output system; and (iii) a reading/writing unit configured to determine a position of a partition of the plurality of partitions in the SSD that corresponds to a reading/writing operation based on the first logical snapshot table in response to the reading/writing operation being performed on the SSD in a manner of Logical Block Addressing (LBA), and the plurality of partitions includes a first partition having a first storage zone and a second storage zone, the first storage zone being a protected zone and configured to store backup system data of the first partition, the second storage zone being a protected zone and configured to store the first logical snapshot table corresponding to the backup system data, the first logical snapshot table including a corresponding relation between a logical disk address and a physical disk address of the backup system data, and the protected zone being read only and prohibited from being erased, the system recovery method comprising:
receiving a system recovery signal;
reading the first logical snapshot table stored in the second storage zone of the first partition of the SSD in response to the received system recovery signal;
reading the backup system data stored in the first storage zone of the first partition of the SSD according to the first logical snapshot table; and
loading the read backup system data.

15. The system recovery method according to claim 14, further comprising, before receiving the system recovery signal:
receiving a system backup signal;
backing up system data stored in the first partition of the SSD at a current backup time instant according to the system backup signal to obtain the backup system data, and setting a storage zone of the first partition of the SSD that is occupied by the backup system data as the first storage zone; and
backing up the first logical snapshot table corresponding to the backup system data, and setting a storage zone of the first partition of the SSD that is occupied by the first logical snapshot table as the second storage zone.

16. The system recovery method according to claim 15, wherein the backing up the system data and the setting the storage zone of the SSD comprises:
defragging data in a predetermined segment of logical disk addresses in the first partition of the SSD at the current backup time instant as the system data to make the storage zone occupied by a defragged system data smaller than the storage zone initially occupied by the system data;
setting the storage zone occupied by the defragged system data as the first storage zone; and
setting the first storage zone as the protected zone.

17. The system recovery method according to claim 16, wherein the storage zone comprises at least one block and each of the at least one block comprises at least one page, and defragging data in the predetermined segment of logical disk addresses in the SSD at the current backup time instant as the system data to make the storage zone occupied by the defragged system data smaller than the storage zone initially occupied by the system data comprises:
detecting whether a block of the at least one block that meets a predetermined condition exists in the storage zone initially occupied by the system data, wherein the predetermined condition comprises that (i) a current block does not belong to the protected zone, (ii) valid data is stored in at least one page of the current block, and (iii) a storage utilization ratio of the current block is smaller than a predetermined threshold; and
in response to detecting the block that meets the predetermined condition, moving the valid data stored in the block that meets the predetermined condition into other blocks of the at least one block thereby the storage utilization ratio of the other blocks or the block except for a last block being greater than or equal to the predetermined threshold, wherein the storage utilization ratio is a ratio of a page number of the current block storing the valid data to a total page number of the current block.

* * * * *